United States Patent [19]
Stephenson, Jr.

[11] 3,787,623
[45] Jan. 22, 1974

[54] SYSTEM MONITOR FOR CREDIT SYSTEM

[76] Inventor: Kenrick O. Stephenson, Jr., 79 Edgemont Rd., Upper Montclair, N.J. 07043

[22] Filed: Mar. 9, 1971

[21] Appl. No.: 122,467

[52] U.S. Cl. ........ 179/2 DP, 340/149 A, 340/152 R, 179/2 CA, 235/61.7 B
[51] Int. Cl. .......................................... H04m 11/06
[58] Field of Search ..... 340/149 A, 152 R, 146.1 E; 235/61.7 B, 153 AC, 153 A; 179/2 CA, 2 A, 179/2 DP, 2 R

[56] References Cited
UNITED STATES PATENTS

| | | | |
|---|---|---|---|
| 3,646,519 | 2/1972 | Wollum | 235/153 AC |
| 3,581,074 | 5/1971 | Waltz | 235/153 AC |
| 3,622,877 | 11/1971 | MacDavid | 340/146.1 E |
| 3,596,245 | 7/1971 | Finnie | 340/146.1 E |
| 3,576,539 | 4/1971 | Huber et al. | 340/152 R |
| 3,617,639 | 11/1971 | Propper | 179/2 DP |
| 3,308,238 | 3/1967 | Brothman | 179/2 DP |
| 2,945,915 | 7/1960 | Strip | 340/146.1 E |
| 3,496,536 | 2/1970 | Wheeler et al. | 340/146.1 E |
| 3,609,692 | 9/1971 | Blake | 340/152 |

*Primary Examiner*—Kathleen H. Claffy
*Assistant Examiner*—Thomas D'Amico
*Attorney, Agent, or Firm*—Woodcock, Washburn, Kurtz & Mackiewicz

[57] ABSTRACT

In a credit checking system, a system monitor tests the communications link between counter units in outlying stores and a central location. The system monitor periodically sends Request signals over a telephone line to the central processing unit. In response to an unconditionally valid account number encoded by the system monitor and transmitted to the control processing unit (CPU), a valid signal is returned to the monitor. If this valid signal is not received, the counter units are switched to an emergency imprint mode which allows all counter units to operate as if the CPU were transmitting valid signals to the units. Indicating devices are provided at the central processor and at the stores for indicating the nature of the malfunction in communications and to facilitate trouble-shooting.

3 Claims, 4 Drawing Figures

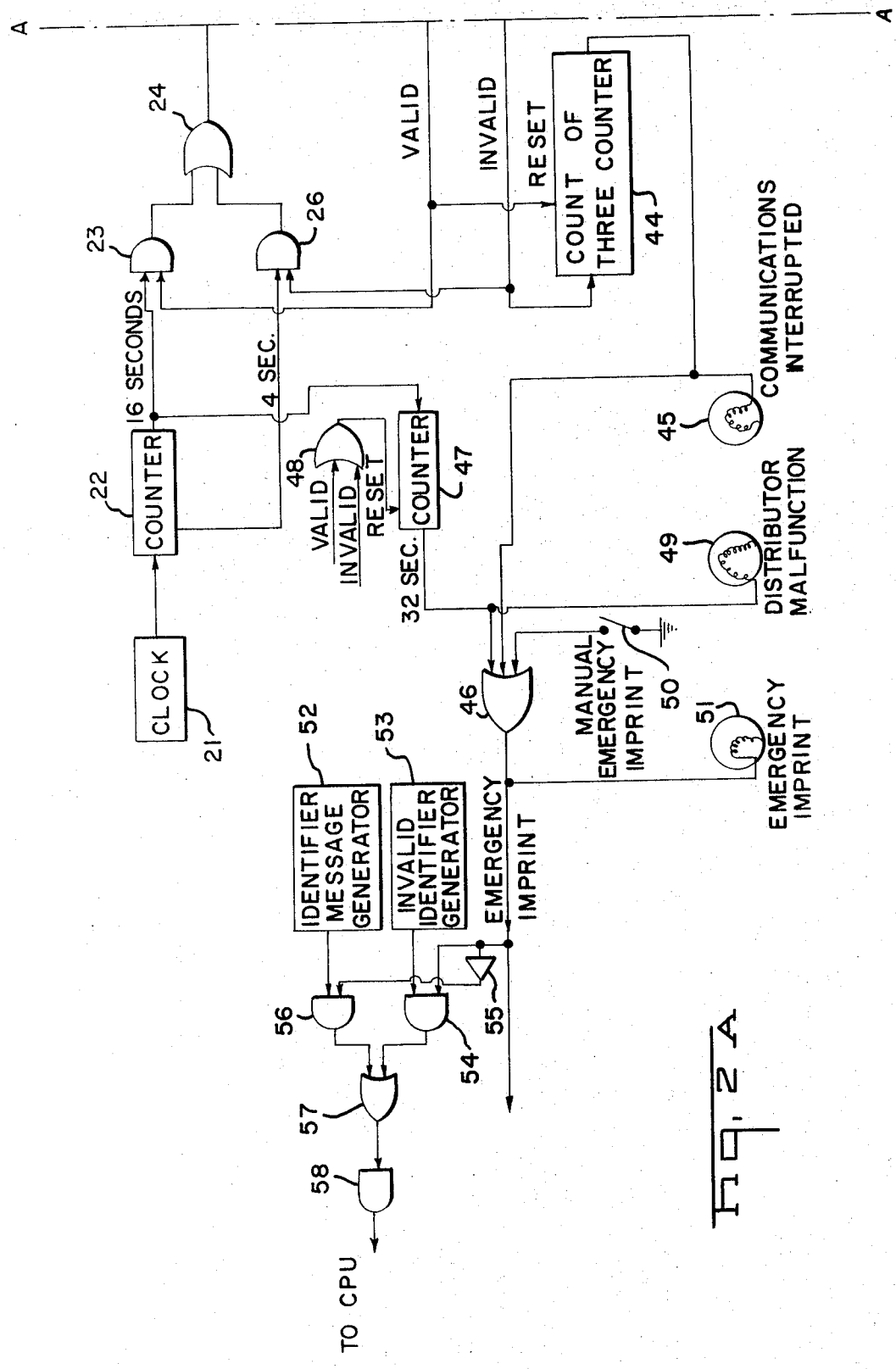

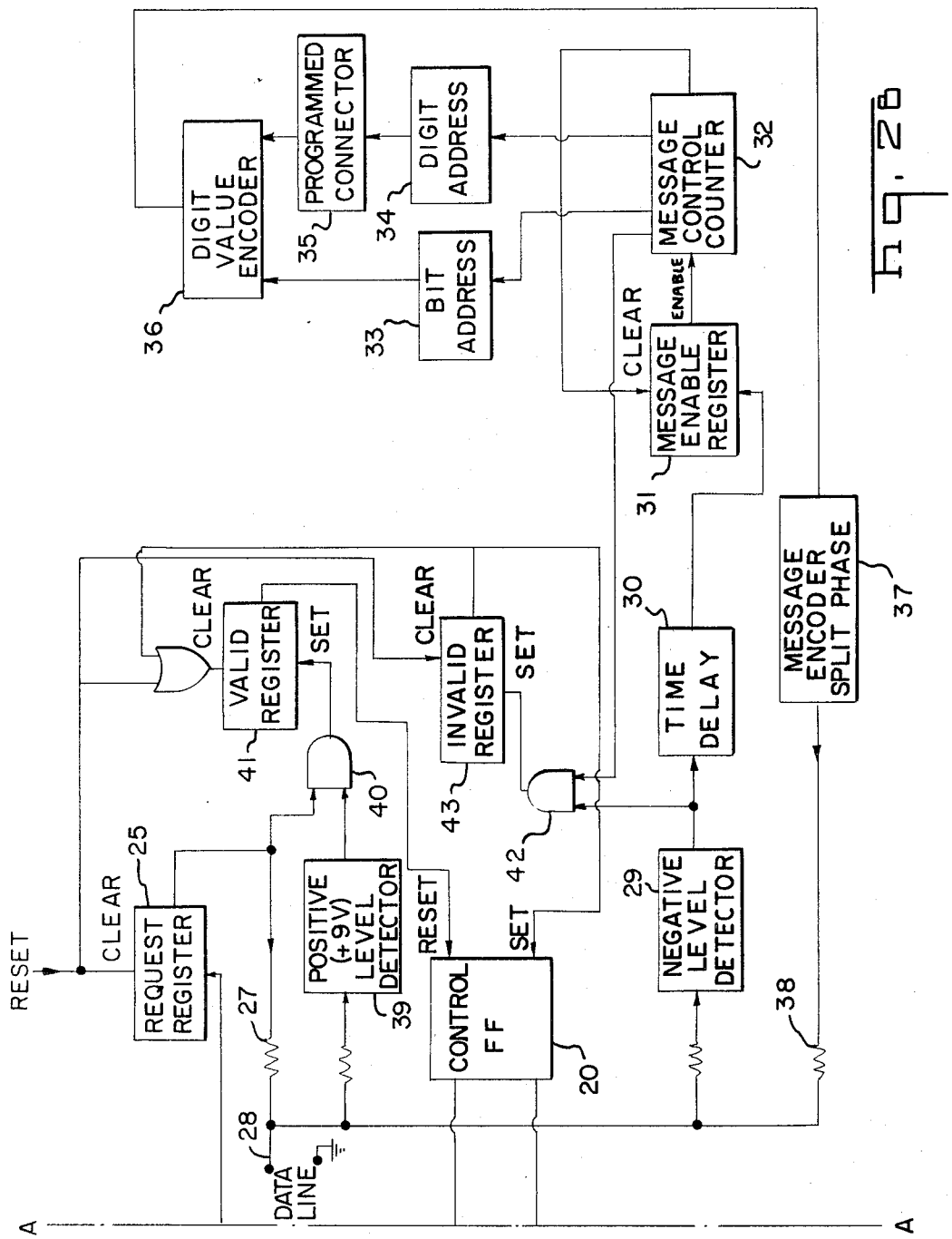

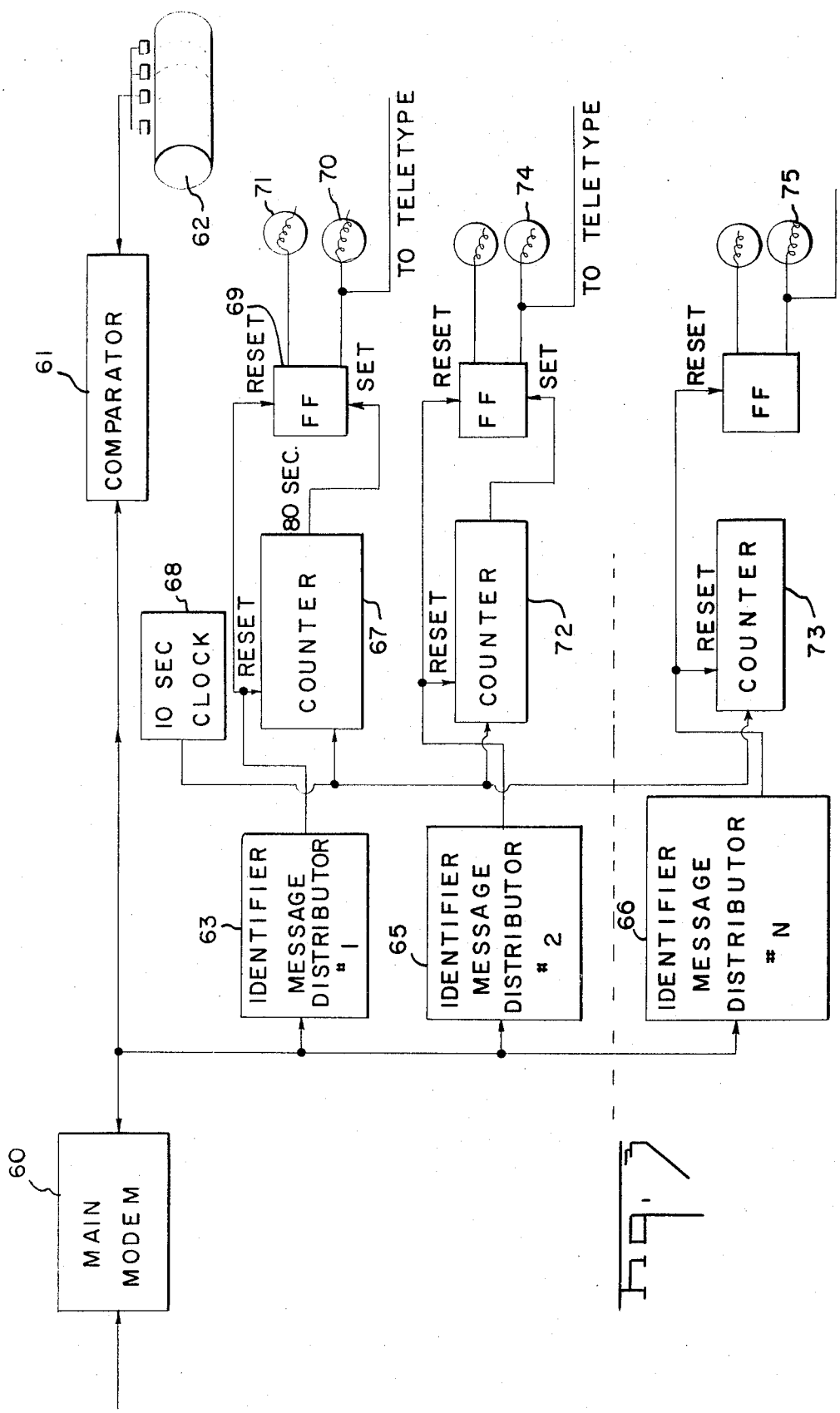

SYSTEM MONITOR FOR CREDIT SYSTEM

BACKGROUND OF THE INVENTION

This invention relates to credit checking systems and more particularly to a system monitor for a credit checking system.

High speed verification of a customer's credit status has been a long-standing requirement in merchandising. Fraud in retail merchandising is an increasing problem. This originates both with purported customers who improperly use credit cards and with the store personnel.

Automatic point of sale credit checking systems have been put into use. One such system is described in U. S. Pat. No. 3,576,539, Ser. No. 769,083, Stephenson et al.,. The present application is an improvement on the system described in that patent. Specifically, the present invention solves a problem which exists because telephone communication lines, used to connect outlying stores to the central processing unit, are sometimes inoperative. When a telephone line is inoperative, the counter units at the retail stores are inoperative causing great concern to the retail establishment which cannot conduct its business in the normal manner. Moreover, the operator of the credit checking system is sometimes overburdened with service calls because the retail establishment reports faulty equipment when in fact the trouble lies in a telephone line.

While it is important to provide some type of backup service so that sales can be completed when the phone line is inoperative, it is also important that the sales personnel are not apprised of the emergency situation. In some situations, awareness of the lack of credit checking capability may entice the sales personnel to participate in fraudulent credit card use while the facilities for guarding against such use are not available.

SUMMARY OF THE INVENTION

It is an important object of this invention to provide a system monitor which tests the communications link between counter units and the central location in a credit checking system.

It is a further object of this invention to automatically switch counter units to an emergency imprint mode of operation when the system monitor determines that the communications link between the counter units and the central location is inoperative. In the emergency imprint mode of operation retail sales transactions can be completed without reliance upon the credit checking at the central processing unit.

It is a further object of this invention to switch the counter units to an emergency imprint mode of operation in such a manner that the sales personnel using the system do not know that the system is inoperative.

It is a further object of the invention to provide a system in which an indication is automatically made at the central location when counter units at one of the outlying locations is switched to an emergency imprint mode of operation. This provides an indication which is useful in trouble-shooting the system and particularly in dispatching service personnel to an inoperative outlying location. It also aids in preventing unauthorized personnel from switching to an emergency imprint mode of operation to aid and abet a fraud on the retail establishment.

It is a further object of the present invention to provide a timer at the central location which monitors the activity at each of the outlying locations and which is timed out in the absence of activity in a given time span. This signals that the outlying location has been disconnected from the central location and that a service problem in the communications link exists.

DESCRIPTION OF THE DRAWINGS

FIGS. 2A and 2B together are a block diagram of the system monitor at the distributor unit; and FIG. 3 is a block diagram of the central processing unit showing the system monitor functions at that location.

DESCRIPTION OF THE PARTICULAR EMBODIMENT

Figure 1:
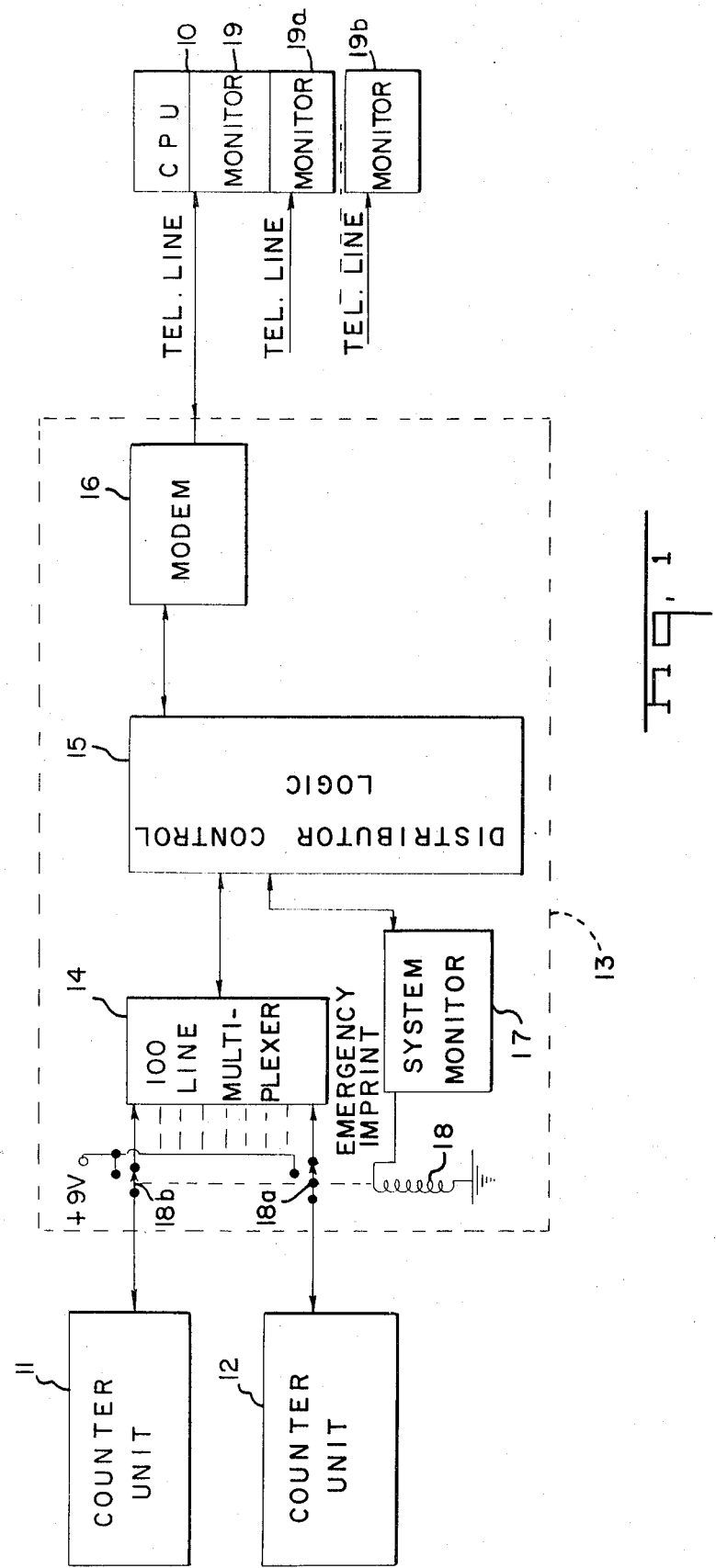
FIG. 1 is a block diagram of the system.

This system will be described as an improvement on the system of the aforementioned Stephenson et al. patent and the disclosure of that patent is specifically incorporated by reference herein.

The credit verification system includes a central processor unit 10 having storage means for storing signals representing the status of account numbers, for example, the charge account numbers of customers whose credit is not to be honored. A plurality of counter units, for example, counter units 11 and 12, are located at outlying locations. These are commonly the different branch stores of the chain of retail stores interconnected by this system. Each of these counter units includes circuitry for generating a request for service upon entry of a charge account number. They also include means for encoding the charge account number as an electrical signal in response to transmit signals which originate at the central processor unit 10. The counter units are each connected to the distributor unit 13. As many as 100 counter units may be connected to each distributor. Each of the distributors is connected over a telephone line to the central processor unit.

Each distributor includes a multiplexer 14 for successively scanning each of the counter units connected to the input of that distributor unit and for servicing these counter units in response to a request for service. The codes from the counter units are transmitted through distributor control logic 15 and a modem 16 to the central processor unit 10 which compares the encoded charge account number with the numbers contained in memory.

In accordance with this invention, a system monitor 17 in each distributor tests the communications link between counter units and the central location. The system monitor 17 is very similar to a counter unit in that it generates Request signals which are transmitted to the central processor unit. It receives transmit signals from the central processor and in response thereto sends an unconditionally valid account number to the central processor unit. The central processor unit generates a valid signal which is sent back to the system 17. In the event that the system monitor does not receive a valid reply in response to three successive Request signals, it switches the counter units to the emergency imprint mode of operation. This is accomplished in the specific embodiment by energization of the relay 18. This actuates switches 18a, 18b, and others which are connected in each of the lines between the counter units and the multiplexer. This applies a +9 volt signal to each of these lines. The +9 volt signal is a valid signal so that each time one of the counter units generates a request, it will get a valid response.

As will be subsequently explained, each distributor is monitored at the central processing unit to determine whether the telephone link with that distributor is operative. Specifically, activity originating with each distributor unit is monitored. There is a timer for each distributor in the monitors 19, 19a and 19b at the central processor. Activity from the distributor is used to reset the timer. If the timer times out before receiving an indication of activity, there is an indication that the communications line between the central processor and that distributor is faulty.

The details of the system monitor 17 at the distributor unit are shown in FIGS. 2A and 2B. This circuitry periodically sends Request signals to the central processor unit. During normal operation a Request signal is sent every 16 seconds. After an invalid signal has been received the sampling is increased to every 4 seconds. A control flip-flop 20 controls whether Requests are generated at a 4-second or 16-second rate. Request pulses originate with a clock 21 which is counted down by a counter 22. Every 16 seconds the counter 22 produces a pulse which, during normal, or valid operation, passes through AND gate 23 and OR gate 24 to set the Request register 25.

Alternatively, during a time when the communication link is inoperative, as signaled by an invalid setting of control flip-flop 20, four second pulses pass through AND gate 26 and OR gate 24 to the Request register 25. In generating a Request signal, receiving a Send signal, generating an unconditionally valid account number, and in receiving either an invalid or valid response thereto, the operation of the system monitor is very similar to the operation of the counter units described in the aforementioned Stephenson et al. patent. This operation is as follows.

The request register 25 applies, through a resistor 27 a +1 volt level to the data line 28. The line 28 is one-half of a two-wire line, the other half being grounded. This two-wire line is connected to the distributor unit.

The distributor unit senses the +1 level on the line 28. The distributor imposes a −9 volt "send" pulse on the data line 28.

The −9 volt "send" pulse is sensed by the negative level detector 29 which produces an output. After a time delay, indicated at 30, the message enable register 31 is set. When the message enable register 31 is set, it enables the message control counter 32 to start counting clock pulses.

The message control counter 32 includes eight stages. The outputs of these eight stages are used to encode the credit card number into 10 serial digits each of which includes four serial bit times. The outputs of the stages in the message control counter 32 are applied to the bit address decoder 33 to encode the bit times and they are applied to the digit address decoder 34 to decode the digit times.

Digit address decoder 34 successively produces a zero or low condition on 10 digit address lines which are connected to the programmed connector 35. The output of programmed connector 35 is a set of digit value lines which are connected to the digit value encoder 36. The digit value encoder 36 produces ten serial digits each broken up into four bit times and each representing one of the numbers in an unconditionally valid credit card number in NRZ (non-return to zero) code. The serial NRZ code is applied to a message encoder 37 which produces an an output the credit card number encoded in split phase, or Manchester, code. This code is applied to the data line 28 through a resistor 38. The code, superposed on a request level, causes the data line to be at 2 volts when the encoder 37 output is high and at 1 volt when the encoder 37 output is zero.

The encoded message is transmitted through the distributor to the central processor unit. A +9 volt "valid" signal is sent back through the distributor unit to the data line 28. The +9 volt pulse is detected by the positive level detector 39. The resultant pulse is applied to an AND gate 40. The other input too the AND gate 40 is the request signal. When both a request signal and a valid signal are present at the input of AND gate 40, the valid register 41 is set. The valid register 41 resets the control flip-flop 20.

If the message transmitted to the central processor is not received, or if the valid response is not received by the distributor, the distributor "times out." That is, it switches to the next counter unit and applies an invalid signal to the data line 28. This −9 volt pulse, which is longer in duration than the −9 volt "send" pulse, is detected by negative level detector 29 which produces an output which is applied to the AND gate 42. Again, the time delay 30 is actuated, the message enable register 31 is set, and the message control counter 32 begins to count.

The line between the message control counter and the gate 42 goes up after the first stage in the message control counter has been actuated. If the output of negative level detector 29 is still up, indicating that the negative pulse on the data line is relatively long and is not a "send" pulse, then the output of the AND gate 42 sets the invalid register 43. The invalid register sets the control flip-flop 20.

The number of the invalid responses is counted by the count of three counter 44. Upon receipt of three consecutive invalid responses, without being reset by a valid response, the count of three counter 44 energizes the indicator 45 to indicate that communications have been interrupted. The same signal acts through OR gate 46 to produce an emergency imprint signal. As indicated with reference to FIG. 1, this actuates relay contacts which apply valid response signals to the counter units.

There is another possible malfunction which is monitored by the system monitor. This is a distributor unit malfunction. If the distributor unit is malfunctioning, there will be no response, valid or invalid, to a Request signal. In order to detect this situation a timer counter 47 is provided. This counts the pulses from the counter 22. The counter 47 is reset by either a valid or an invalid response applied through OR gate 48. If the counter 47 is not reset within a 32-second interval, it produces an output which acts through OR gate 46 to produce the emergency imprint signal. It also energizes indicator 49 to indicate the distributor malfunction.

The emergency imprint mode of operation can also be produced by closure of the manual switch 50. When the emergency imprint mode of operation exists, it is indicated by the emergency imprint indicator 51.

It is also desirable to provide an indication at the central processing unit when one of the distributors is in the emergency imprint mode. Otherwise, it might be possible for an unauthorized person to manually set the emergency imprint mode of operation and assist in the perpetration of a fraud on the retail store. When the distributor is switched to emergency imprint, an invalid distributor identifier number is sent to the central processor unit. The identifier message generator 52 normally generates valid identifying numbers which are sent to the central processing unit. This distributor identifier accompanies each account number transmitted to the central location. The identifier message generator 52 corresponds with the identifier message generator 631 in FIG. 6c of the aforementioned Stephenson et al. patent. This identifier message generator performs the same function and is controlled in the manner set forth in that patent. Its operation is modified in that an invalid identifier generator 53 is enabled to generate invalid identifications when an emergency imprint condition exists. The logic for performing this includes AND gates 54 and 56 and an inverter 55. During normal operation valid distributor identifiers from generator 52 pass through AND gate 56, OR gate 57 and AND gate 58, corresponds to the AND gate 630 in the Stephenson et al. patent. However, during an emergency imprint, invalid distributor identifier numbers pass through AND gate 54, OR gate 57 and AND gate 58.

FIG. 3 shows the central processing unit. As more fully explained in the Stephenson et al. patent, messages from the distributor pass through modem 60 to a comparator 61 which compares encoded account numbers with respresentations of the credit status of the account numbers stored on the drum 62. The distributor identifier messages are detected by the detectors indicated at 63, 65, and 66. That is, the detector 63 produces an output upon receipt of an identifier message from distributor No. 1; detector 65 produces an output upon detection of an identifier message from distributor No. 2. and so on.

A timer counter 67 produces an output signal a predetermined time after it starts counting. It counts 10-second clock pulses from the clock 68 and produces an output 80 seconds after it starts counting unless it is reset in the meantime. The timer counter 67 is reset from the output of the identifier message detector 63. This signal also resets the flip-flop 69. If the timer counter 67 times out, it sets the flip-flop 69. This energizes the indicator 70 which indicates that distributor No. 1 is an emergency imprint. The same signal is applied to the teletypewriter to indicate the time that distributor No. 1 went on emergency imprint. An indicator 71 is normally energized to indicate a normal condition of operation.

Timer counters 72 and 73 are provided for other distributors. These similarly energize indicators 74 and 75 to indicate when those distributor units are on the emergency imprint.

While a particular embodiment of the invention has been shown and described, it will, of course, be understood that various modifications may be made without departing from the principles of the invention The appended claims are, therefore, intended to cover any such modification within the true spirit and scope of the invention.

What is claimed is:

1. A credit checking system comprising:
   a memory at a central location containing representations of the credit status of account numbers,
   a plurality of counter units at remote locations for encoding account numbers,
   means in each counter unit for generating request signals in response to transmit signals originating at said central location,
   comparison means at said central location for comparing encoded account numbers with the representations of the credit status of the account numbers stored in the said central memory,
   means responsive to said comparison means for generating valid or invalid response signals,
   a communication link for transmitting encoded account numbers, and valid or invalid response signals between said counter units and said central location,
   a system monitor for testing the communication link between counter units and said central location, said system monitor including means for transmitting valid signals to counter units not operatively connected over said communication link to said central location,
   said communications link including:
      distributor units, a plurality of counter units being connected to each distributor unit, each distributor unit being connected over a voice grade telephone line to said central location,
   and wherein said system monitor includes the following in each distributor unit:
      means for periodically sending request signals over said telephone line and for receiving transmit signals from said central location, and
      means for sending valid signals to said counter units when a transmit signal is not received within a predetermined time period after a request signal.

2. The system recited in claim 1 wherein each encoded account number is transmitted with a distributor identifier number, said system further comprising:
   a timer counter at said central location producing an output signal a predetermined time after it starts counting,
   means for resetting said timer each time a distributor identifier number is received, and
   an indicator, said output signal being applied to said indicator to signal that said communications link is inoperative.

3. The system recited in claim 2 wherein each distributor unit further comprises:
   a manual switch for activating said means for sending valid signals to said counter units, and
   means for changing said distributor identifier number to an invalid number when only valid signals are being send to said counter units.

* * * * *